United States Patent [19]
Szabo

[11] 3,983,017
[45] Sept. 28, 1976

[54] RECOVERY OF METAL VALUES FROM MANGANESE DEEP SEA NODULES USING AMMONIACAL CUPROUS LEACH SOLUTIONS

[75] Inventor: Lester J. Szabo, Charlottetown, Canada

[73] Assignee: Kennecott Copper Corporation, New York, N.Y.

[22] Filed: Feb. 10, 1975

[21] Appl. No.: 548,430

Related U.S. Application Data

[63] Continuation-in-part of Ser. No. 311,063, Dec. 1, 1972, abandoned.

[52] U.S. Cl. ................................ 204/106; 204/112; 423/24; 423/32; 423/33; 423/49; 423/53; 423/139; 423/150; 75/103; 75/117; 75/119
[51] Int. Cl.² ...................... C25C 1/12; C25C 1/06; C01G 3/14; C01G 53/12
[58] Field of Search .................. 423/32, 33, 49, 50, 423/53, 150, 246; 75/103, 117, 119, 121; 204/106, 112

[56] References Cited
UNITED STATES PATENTS

| | | | |
|---|---|---|---|
| 2,647,831 | 8/1953 | Allen et al. | 75/103 |
| 2,724,645 | 11/1955 | Stringham et al. | 423/49 |
| 2,733,990 | 2/1956 | Van Hare | 75/117 |
| 3,640,684 | 2/1972 | Klein et al. | 423/32 X |
| 3,728,105 | 4/1973 | Skarbo | 75/103 |
| 3,751,554 | 8/1973 | Bare et al. | 423/32 |
| 3,795,596 | 5/1974 | Kane et al. | 75/121 X |

FOREIGN PATENTS OR APPLICATIONS

| | | | |
|---|---|---|---|
| 577,978 | 6/1959 | Canada | 423/246 |

OTHER PUBLICATIONS

Larson et al., "The Absorption of Carbon Monoxide by Cuprous Ammonium Carbonate and Formate Solutions," J.A.C.S., vol. 44, pp. 2878–2885 (1922).
Vogel, Textbook of Quantitative Inorganic Analysis, Longmans, Green & Co., Ltd., 3rd Ed. (1961) London, pp. 1062–1075.

*Primary Examiner*—Oscar R. Vertiz
*Assistant Examiner*—Brian E. Hearn
*Attorney, Agent, or Firm*—John L. Sniado; Lowell H. McCarter; Anthony M. Lorusso

[57] ABSTRACT

A process in which copper, nickel, cobalt and molybdenum are recovered by direct leaching of comminuted raw manganese nodules with an aqueous ammoniacal leach solution containing cuprous ions. During the process cuprous ions reduce the nodules, are consumed, and are oxidized to cupric ions. The cuprous ions are regenerated by reducing the cupric ions with a reducing gas.

40 Claims, 5 Drawing Figures

RECOVERY OF METAL VALUES FROM MANGANESE DEEP SEA NODULES USING AMMONIACAL CUPROUS LEACH SOLUTIONS

CROSS REFERENCE TO RELATED APPLICATIONS

This application is a continuation-in-part of copending patent application Ser. No. 311,063 (now abandoned) entitled "Recovery of Metal Values from Manganese Deep Sea Nodules", filed on Dec. 1, 1972, the teachings of which are incorporated herein by reference.

BACKGROUND OF THE INVENTION

With the quantity and quality of the world's reserves of copper, nickel, cobalt and molybdenum rapidly diminishing, the metallurgical industry is continually looking for better ways of increasing the recovery of present mineral sources and is vigilant in attempting to develop economically attractive processes to recover metal values from ores believed to be of little economic value. Pelagic sedimentary materials containing significant quantities of metal values have been known since late in the nineteenth century; however, no attempts have been made to recover the metal values therefrom. These pelagic sedimentary materials are considered to be complex ores which do not lend themselves to currently known extractive metallurgical processing techniques. Up to the present time these complex ores, which have been termed "manganese nodules," have only been found on the deep lying floor of the oceans and lakes. Terrestrial ore beds containing manganese, iron, copper, nickel, molybdenum, cobalt and other metal values where the ore has physical characterization similar to ocean floor ores have not as yet been discovered. However, it is not unlikely that the same or similar types of complex ores will be located as terrestrial deposits.

It is known that certain metals may be recovered from ocean floor manganiferous ore deposits. Prior to the present invention it was known that in order to recover high yields of metal values such as copper by leaching from an oxidized manganese ore such as manganese nodules, it is advantageous to reduce the ore. At this point it should be noted that it would be more advantageous to eliminate the reduction step all together since reduction constitutes a step which increases costs. However, many investigators have found it desirable to reduce the ore in order to increase the yields. Because it is advantageous to reduce manganese ores in order to recover various metal values contained therein, there are many prior patents directed to processes for reducing such ores. For example, the following patents assigned to the assignee of the present invention, demonstrate that it is desirable to reduce the manganese dioxide in the nodules to the manganous state in order to recover copper, nickel, cobalt and molybdenum.

U.S. Pat. No. 3,723,095 entitled "Extraction of Copper and Nickel from Complex Ores," by R. R. Skarbo, filed July 16, 1970;

U.S. Pat. No. 3,753,686 entitled "Recovery of Copper, Nickel, Cobalt and Molybdenum from Complex Ores," by T. C. Wilder and J. J. Andreola, filed July 16, 1970;

U.S. Pat. No. 3,736,125 entitled "Two Stage Selective Leaching of Copper and Nickel from Complex Ores," by T. C. Wilder filed July 16, 1970; and U.S. Pat. No. 3,734,715 entitled "Extraction of Metal Values from Complex Ores," by M. J. Redman, filed July 16, 1970.

It should also be noted that although it was known that it is advantageous to reduce the manganese nodules in order to recover the non-ferrous metal values contained therein, prior to the present invention those skilled in the art failed to come up with a method with the economical advantages of the present invention, despite the vigorous research effort made by others trying to recover metals from manganese nodules. It is believed that others were performing research related to various high temperature reduction processes. It is also believed that there is no other low temperature process in which the nodules do not have to be dried to be reduced. For example in the Skarbo process, of U.S. Pat. No. 3,723,095, some high temperature reduction is employed.

The art also recognized the desirability of employing carbon monoxide as a reducing gas since it is readily available and relatively inexpensive. However, at ambient pressures, carbon monoxide will not dissolve in an aqueous slurry of nodules to the degree required to reduce the nodules to the point where metal values can be leached therefrom.

Manganese dioxide is a reactive species which reacts with many reductants. For example, sulfur dioxide and manganese dioxide react to result in a reaction product in which the manganese dioxide is reduced. Reductants such as sulfur dioxide, however, are undesirable for a number of reasons, one of which is that this reductant, as well as many others, cannot be regenerated efficiently. On the other hand, with the process of the present invention, not only can cuprous ions be regenerated; but also, they can be regenerated with carbon monoxide.

In summation, the mining of the vast reserves of manganese deep sea nodules lying over the ocean floor, could be economically justified, if a more economical process were available to effect separation and ultimate recovery of the copper and nickel elements. The recovery of molybdenum and cobalt from these complex ores is also of economic interest.

SUMMARY OF THE INVENTION

In accordance with the present invention, manganese nodules are reduced with an ammoniacal solution of cuprous ions. The cuprous ions are regenerated with a reducing gas such as carbon monoxide. As a result of reducing the manganese nodules, the copper, nickel, cobalt and molybdenum values are leached into the ammoniacal solution from which they can be recovered.

Accordingly, it is an object of the present invention to provide an improved process for solubilizing metal values in manganese nodules.

Another object of the present invention is to provide a process for reducing manganese nodules to render metal values contained therein leachable in which cuprous ions reduce the nodules and in which the cuprous ions are regenerated by a reducing gas.

DESCRIPTION OF THE PREFERRED EMBODIMENT

Figure 1:
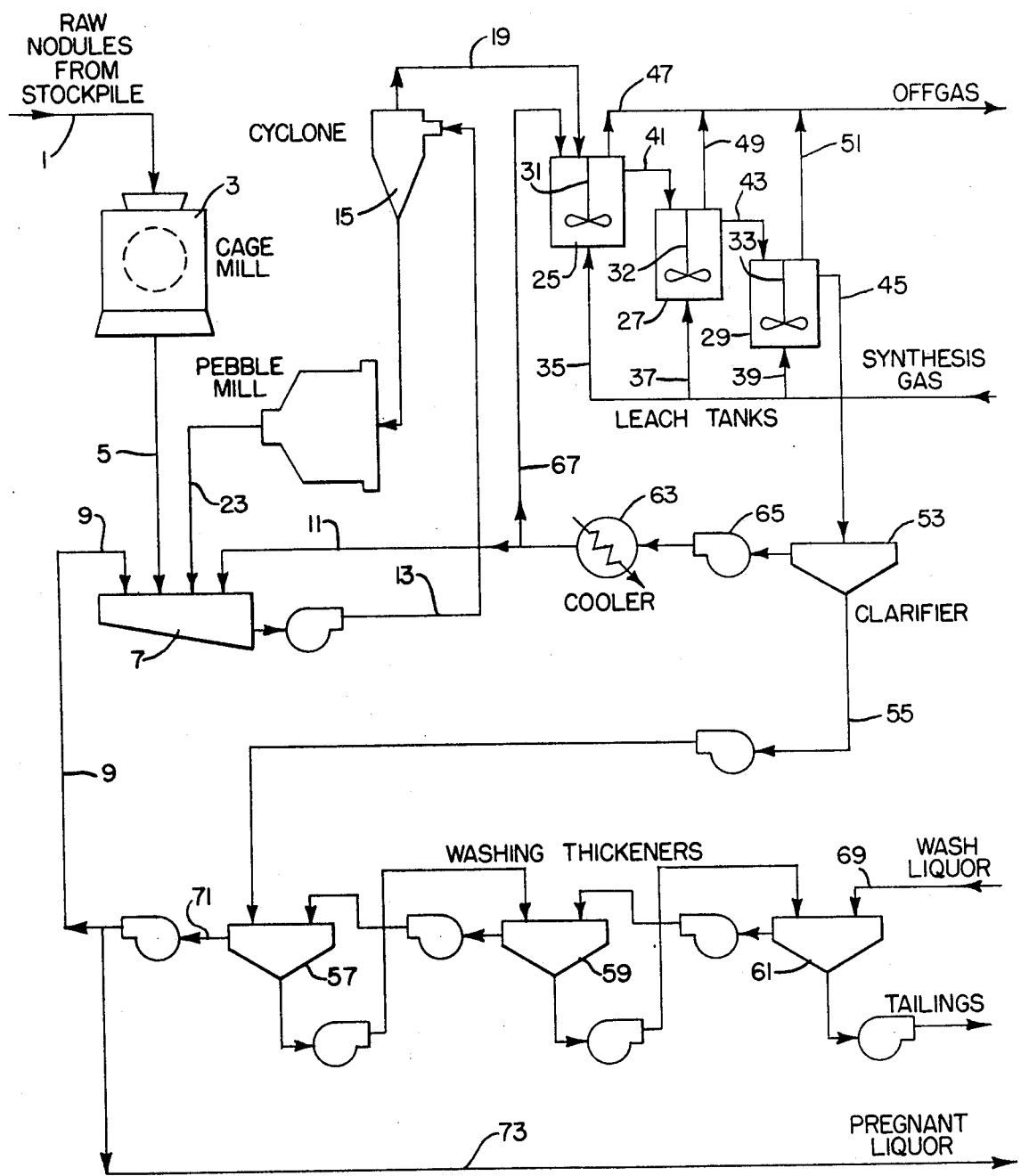
FIG. 1 is a flow sheet illustrating a continuous embodiment of the process of the present invention.

At the outset, the process of the present invention is described in its broadest overall aspects with a more detailed description following. The present invention is directed to the recovery of metal values from manganese deep sea nodules. For the purpose of this patent specification and claims, complex ores which are found on the deep sea floor of oceans and lakes containing manganese, iron, copper, nickel, molybdenum, cobalt and other metal values are variously referred to as deep sea manganese nodules, manganese nodules or nodules.

Ocean floor deposits are found as nodules, loose-lying at the surface of the soft sea floor sediment, as grains in the sea floor sediments, as crusts on ocean floor hard rock outcrops, as replacement fillings in calcareous debris and animal remains, and in other less important forms. Samples of this ore material can readily be recovered on the ocean floor by drag dredging, a method used by oceanographers for many years, or by deep sea hydraulic dredging, a method that could be used in commercial operations to mine these deposits. Mechanical deep sea nodule harvesters are described in U.S. Pat. Nos. 3,480,326 and 3,504,943.

The character and chemical content of the deep sea nodules may vary widely depending upon the region from which the nodules are obtained. The Mineral Resources of the Sea, John L. Mero, Elsevier Oceanography Series, Elsevier Publishing Company, 1965, discusses on pages 127–241 various aspects of manganese nodules. For a detailed chemical analysis of nodules from the Pacific Ocean see pages 449–450 in The Encyclopedia of Oceanography, edited by R. W. Fairbridge, Reinhold Publishing Corp., N.Y. 1966, and U.S. Pat. No. 3,169,856. For the purposes of this invention the complex ores will be considered as containing the following approximate metal content range on a dry basis:

| METAL CONTENT ANALYSIS RANGE - Weight Percent | | | |
|---|---|---|---|
| Copper | 0.8 | – | 1.8% |
| Nickel | 1.0 | – | 2.0% |
| Cobalt | 0.1 | – | 0.5% |
| Molybdenum | 0.03 | – | 0.1% |
| Manganese | 10.0 | – | 40.0% |
| Iron | 4.0 | – | 25.0% |

The remainder of the ore consists of oxygen as oxides, clay minerals with lesser amounts of quartz, apatite, biotite, sodium and potassium feldspars and water of hydration. Of the many ingredients making up the manganese nodules, copper and nickel are emphasized because, from an economic standpoint, they are the most significant metals in most of the ocean floor ores.

Mineral characterization studies have shown that essentially all manganese in the complex ore is in the tetravalent state, as manganese dioxide ($MnO_2$), and that iron is in the trivalent state. It therefore can be assumed that all metals of interest in the complex ore are in their highest naturally occurring valence states. It can also be assumed that these metals are associated with oxygen in oxides, mixed oxides, or more likely in highly complex substituted compounds, the nature of which has not been determined. Nevertheless, for the purposes of extraction, the ore may be considered to be made up of manganese dioxide, ferric oxide, cobaltic oxide, molybdic oxide, nickel oxide and cupric oxide with minor amounts of other oxides and varying amounts of clay.

Ideally, it would be desirable to find a set of conditions which would render the valuable nickel, copper cobalt and molydenum leachable while at the same time not forming soluble species of iron and manganese. The metals which are recoverable from manganese nodules include copper, nickel, (the principal metals of interest) cobalt, molybdenum, zinc, zirconium, thulium and cadmium. Indeed the process of the present invention facilitates the recovery by leaching of any non-ferrous metal that is bound in the ore by a manganese oxide matrix. Of course, the process of the present invention is valuable if iron or manganese is to be recovered from the ore because of the efficient removal of metals other than manganese and iron from the ore.

In accordance with the present invention, raw manganese deep sea nodules are reduced with cuprous ions ($Cu+$) in an aqueous ammoniacal ammonium carbonate solution. The cuprous ions reduce the manganese in the nodules which enables metal values such as copper, nickel, cobalt and molybdenum to be dissolved while leaving undesirable metals such as iron in the solid residue. In the reduction process, the manganese dioxide in the deep sea nodules is reduced by cuprous ion to manganese carbonate according to the reaction

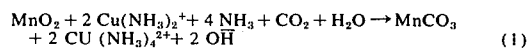

$$MnO_2 + 2\,Cu(NH_3)_2{}^+ + 4\,\underline{NH_3} + CO_2 + H_2O \rightarrow MnCO_3 + 2\,Cu\,(NH_3)_4{}^{2+} + 2\,\overline{OH} \quad (1)$$

Cupric ions indicated in equation (1) are reduced back to the cuprous state with carbon monoxide according to the reaction

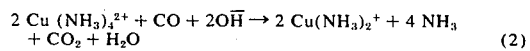

$$2\,Cu\,(NH_3)_4{}^{2+} + CO + 2\overline{OH} \rightarrow 2\,Cu(NH_3)_2{}^+ + 4\,NH_3 + CO_2 + H_2O \quad (2)$$

Cuprous ion is consumed in reaction (1) and its regenerated by reaction (2). The net overall reaction for the reduction process is the sum of equations (1) and (2), or equation (3):

$$MnO_2 + CO \rightarrow MnCO_3 \quad (3)$$

The process includes the steps of grinding raw manganese nodules to a size ranging from about −6 to about −120 mesh and leaching the ground nodules in an aqueous ammoniacal leach solution containing cuprous ions. All mesh sizes herein refer to the U.S. Sieve Series. When a mesh size is stated as minus 60, or −60, it means that all particles will pass through a 60 mesh sieve. As received the manganese nodules may contain up to 40% by weight moisture. The nodules may be ground in this condition, i.e., containing the moisture, or part of the moisture may be removed by mechanical means or drying. It is, however, an economic advantage not to remove the moisture before grinding the raw manganese nodules.

The leach solution may contain an ammonia concentration of from about 60 grams per liter to about 140 grams per liter and from about 2 grams per liter to about 20 grams or more per liter copper in the cuprous state. The ground manganese nodules are then slurried with the aqueous ammoniacal leach solution, containing the cuprous ions, for a period of time sufficient to reduce the manganese oxides in the nodules to enable metal values such as copper, nickel, cobalt and molybdenum to be solubilized, while the iron and manganese remain in the nodule residue. The leaching liquid to solid weight ratio should be between at least about 4 to 40 or more and preferably greater than 20 such that the nodule-leach solution slurry will contain from about 2 to 20% solids. The leaching period may be from about 30 minutes or longer and preferably between about 45 minutes to about 2 hours. While the temperature of the leach solution, during the leaching step, may be at ambient temperatures, it is preferred that the leaching take place between about 40° and 70°C and at a pressure of approximately one atmosphere. The pregnant leach solution is then separated from the nodule residue. The nodule residue is washed with an ammoniacal ammonium carbonate solution to remove these entrained metal values from the residue. Metal values are recovered from the wash effluent. The reduction liquor can be recycled to the reaction vessel in which the manganese nodules are added. To maintain a sufficient amount of cuprous ions, a reducing gas, such as carbon monoxide, is passed through the reaction vessels.

The pH value of the leach solution should be maintained alkaline at all times. During the reduction and leaching, the pH will be between about 9.0 and 12.0, with a pH between 10.5–10.8 being preferred. Carbon dioxide may be bubbled into the leach solution of lime may be added to adjust the pH value as is necessary.

The ammoniacal leach solution must contain cuprous ions. The cuprous ions may be put into the leach solution in any convenient manner. For example, cuprous salts, such as the cuprous halides and cuprous oxide, may be dissolved in an aqueous ammoniacal solution. Another and more preferred method of getting cuprous ions into the leach solution is to solubilize cupric compounds and reduce the cupric ion in the solution. Cupric compounds in solution may be reduced by bubbling a reducing gas such as carbon monoxide through the solution.

The preferred embodiments of this invention are accomplished in continuous processes. The continuous processes are best accomplished where the manganese deep sea nodules are added at a controlled rate commensurate with the formation of cuprous ions in the leach solution such that there is always an excess of cuprous ions in the ammoniacal leach solution. The significance of the present invention is illustrated by the following non-limiting examples.

EXAMPLE I

Raw manganese nodules having a chemical analysis within the range set forth above, and containing retained water, were ground and slurried with a solution containing 105 grams per liter ammonia, 79 grams per liter carbon dioxide, and 4.4 grams per liter copper as cuprous ion. The leaching was contained for 1 hour at room temperature. the pregnant leach solution was separated from the nodule residue and chemical analysis indicated that 98.4% of the nickel and 96% of the copper were extracted from the nodules.

EXAMPLE II

A. An aqueous leach solution was prepared containing about 8 grams per liter nickel, 7 grams per liter copper, 0.5 grams per liter cobalt, 102 grams per liter ammonia and 35 grams per liter carbon dioxide. Some of the copper in the solution was in the cuprous state. The remaining cupric copper was reduced to the cuprous state by bubbling carbon monoxide gas through the aqueous leach solution at a temperature of between about 40 and 60° C. for approximately ½ hour.

Untreated manganese deep sea nodules having an analysis within the range set out above were ground to −60 mesh and were added to the solution to obtain a liquid/solid ratio of about 40. The slurry was agitated by mechanical stirring while carbon monoxide gas was bubbled through the solution. After about an hour most of the manganese dioxide ($MnO_2$) was reduced to manganous oxide ($MnO$) and consequently converted to insoluble manganese carbonates. Over 90% of the copper and nickel were extracted from the nodules.

B. This experiment was repeated except that the leach solution did not contain copper. Carbon monoxide was bubbled through the leach solution as before. Chemical analysis of the leach solution and residue showed that insignificant quantities of copper and nickel were leached from the nodules. Thus, it is seen that a reducing gas such as carbon monoxide does not reduce tetravalent manganese dioixde to divalent manganous oxide such that the copper and nickel may be leached from the manganese deep sea nodules.

Examples I and II-A show that cuprous ions reduce the nodules so that copper, nickel and cobalt can be selectively leached. Example II-B shows that this reduction and selective leaching is not accomplished with a reducing gas such as carbon monoxide in the absence of cuprous ions.

EXAMPLE III

In a series of experiments, raw or untreated manganese nodules ground to −60 mesh were slurried with 200 ml. of aqueous ammonia, containing initially 102 grams ammonia per liter, having a known cuprous ion concentration, a known temperature and a known pH value. The cuprous ion was regenerated in the nodule leach solution slurry by bubbling carbon monoxide through. The time required for regeneration of the cuprous ion, reaction temperatures, the extent of the reduction of the nodules and the percent recovery of the metal values were the parameters observed. Table I below presents these results.

The percent reduction in Table I is based on the amount of manganese in the residue at the end of the reaction which is present in the +4 (tetravalent) oxidation state. Except where noted the solvent in each case consisted of 200 ml. of solution containing initially 102 grams per liter ammonia. The initial pH value was obtained through the addition of carbon dioxide to the leach solution.

The residues from each experiment were filtered and washed four times with ammoniacal-ammonium carbonate solutions, the pH of which were usually adjusted to some value near that at which the reaction took place. In some instances the leaching was done, as indicated in Table I. Thus the percent extractions are based on what is extracted during the reduction stage with some washing.

It can be observed from this data that the reduction of cupric ion to cuprous ion is favored by high pH values. It is also noted that cupric ion reduction to cuprous ion is more favorable at temperatures up to 60° C.

quired for the nodules to progress through the system, would be approximately 2 hours.

Samples of the liquor and solids were taken periodically and analyzed. The cuprous ion level in each cell was determined in this manner. The solids were analyzed for the extent of reduction of the manganese dioxide to manganous oxide and after washing the residues were analyzed for the amounts of metal values remaining. The wash process consists of placing the solid samples in wash liquor consisting of ammoniacal ammonium carbonate solution adjusted to the pH of the reduction process and heated to 45° C. Samples were stirred vigorously for 1 hour and then filtered. This procedure was repeated three times.

Steady state of the system was reached in approximately 3 hours as evidenced by the relatively constant

TABLE I

Reduction of manganese nodules by cuprous ion. The solvent is 200 ml of aqueous ammonia. (102g $NH_3$/l) with sufficient $CO_2$ to obtain proper pH.

| Exp. No. | Temp. °C. | g $Cu^+$/l | pH | g. Nodules | Time (min) | % Reduction of $MnO_2$ to MnO | % Extraction Cu | Ni | Co |
|---|---|---|---|---|---|---|---|---|---|
| 3-1 | 43 | 8.5 | 11.5 | 6.00 | 61 | 25.1 | 4.06 | 23.0 | 38.4 |
| 3-2 | 60 | 12.7 | 10.0 | 2.00 | 17 | 90.9 | 58.5 | 83.1 | 18.4 |
|  |  |  |  |  | releach, 2 hrs. pH 9.5, 45°C |  | 68.3 | 81.0 | 33.9 |
| 3-3 | 60 | 8.2 | 9.5 | .50 | 60 | — | 90.0 | 93.5 | 87.5 |
| 3-4 | 40 | 7.6 | 10.5 | 2.0 | 63 | 93.6 | 36.9 | 91.8 | 53.2 |
| 3-5 | 40 | 10.0 | 10.3 | 1.3 | 29 | 94.9 | 82.4 | 89.6 | 30.0 |
|  |  |  |  |  | releach, 1 hr. pH 10.0, 40°C |  | 84.8 | 91.4 | 36.7 |
| 3-6 | 40 | 10.0 | 10.0 | 1.3 | 39 | 98.1 | 64.6 | 82.6 | 9.9 |
| 3-7 | 45 | 10.0 | 10.0 | 2.8 | 79 | — | 29.9 | 92.0 | 69.4 |
|  |  |  |  |  | releach, 1 hr. pH 10.0, 25°C |  | 86.7 | 93.6 | 80.4 |
| 3-8 | 60 | 10.0 | 9.5 | 2.8 | 93 | 95.2 | 45.5 | 88.2 | 32.2 |
|  |  |  |  |  | releach, 1 hr. pH 9.5, 40°C |  | 56.0 | 90.5 | 44.1 |
| 3-9* | 40 | 8.6 | 10.7 | 4.4 | 45 | 60.0 | 94.4 | 85.6 | neg. |
| 3-10** | 40 | 10.0 | 11.5 | 2.8 | 17 | 86.7 | 72.7 | 87.2 | 83.2 |

*Solvent was synthetic pregnant liquor. 7g Cu/l, 8g Ni/l, 1g Co/l, 600 ml
**Solvent initially was 10M $NH_3$

EXAMPLE IV

This example illustrates the continuous recovery of copper and nickel from manganese deep sea nodules.

A three stage continuous flow reduction circuit (see FIG. 1) was designed and constructed to allow study of the nodule reduction under flow-through conditions. The system is provided with three reaction vessels. In operation the dry nodules were fed through a screw feeder into the first stage. The resultant slurry in the first stage is then transferred to successive stages by an overflow system.

In this example a synthetic pregnant liquor containing approximately 12.0 grams per liter copper, (as cuprous) from about 14 grams per liter total copper, 14 grams per liter nickel, 0.8 grams per liter cobalt and 10 grams per liter chloride ion in six molar ammonia. Note that the chloride ion appears in the pregnant liquor as a result of being extracted from the nodules. The synthetic pregnant liquor was circulated through the system at a rate of approximately 1.5 liters per hour at a temperature of about 45° C. The initial cuprous ion level was about 12.0 grams per liter. Carbon monoxide and hydrogen were introduced into each cell at a rate of approximately 90 milliliters per minute. The pH value of the initial liquor was adjusted to 10.6 by adding carbon dioxide gas. Dry nodules ground to approximately −60 mesh were fed into the system at a rate of 40 grams per hour. This would produce a 2.6% slurry (i.e., a solids-liquid weight-ratio of about 38.4) at steady state and the hold-up time, i.e., the time revalues of the cuprous ion concentration in each stage and the extent of the reduction achieved. The experiment lasted approximately 10 hours with a steady state being held for approximately 6.5 hours. A summary of the steady state is given in Table II below.

TABLE II

Steady state conditions in this example are nodule feed 40 g/h (−60 mesh), recycle rate 1.5 l/hr., total Cu 14 g/l, 10 g/l $Cl^-$.

|  | 1st Stage | 2nd Stage | 3rd Stage |
|---|---|---|---|
| Cuprous ion g/l | 4.2 | 9.0 | 11.6 |
| Extent of reduction ($MnO_2$ to MnO) | 61% | 87% | 97.5% |
| Copper extraction | 60% | 89% | 94% |
| Nickel extraction | 50% | 86% | 92% |

The above example shows that under steady state conditions in a continuous process that over 97% of the tetravalent manganese in the nodules can be reduced to the divalent manganese form. This results in the concomitant recovery of over 90% of the copper and nickel from the nodules and thus shows the effectiveness of retaining cuprous ion, present in the leach solution, at all stages of the reduction process.

CONTINUOUS PROCESSES

As is stated above, it is preferred to operate the present invention in a continuous manner. In this regard, FIG. 1 is a flow diagram of a process based upon the present invention which is continuous upon reaching equilibrium. Initially, the process is provided with an aqueous ammonia leach solution containing approximately the following constituents: from about 60 to about 140 grams per liter ammonia, from about 20 to 60 grams per liter carbon dioxide, from about 2 to about 20 grams or more copper per liter, from about 8 to about 20 grams per liter nickel, from about 10 to aout 20 grams per liter chloride, and from about 0.5 to about 4 grams per liter cobalt. Raw ore 1 from the stockpile is fed to cage mill 3 where the manganese nodules are reduced in size, i.e., such as to pass through a 6 mesh sieve. The comminuted nodules 5, having been reduced to −6 mesh size in the cage mill 3, are conveyed to a mixing tank 7 where they are slurried with wash liquor recycle 9 and reduction liquor recycle 11. From the mixing tank 7 the nodule slurry 13 is fed to a cyclone 15 where oversize nodule particles 17 are separated from under size nodule particles 19. The oversize nodule particles 17, along with a portion of the leach liquor, are fed to a pebble mill 21 where the oversize nodule particles are reduced in size. The output 23 of the pebble mill 21 is fed back into the mixing tank 7. The undersize nodule particle output 19 from the cyclone, along with most of the leach liquor, is fed into the first tank 25 of a series of leaching tanks 25, 27, 29. Three leaching tanks are shown in the accompanying drawing. However, the number of leaching tanks may be varied from about 3 to 6 or more depending upon the design and economics of the process. Each of the leaching tanks 25, 27, 29 are provided with impellers 31, 32, 33 to agitate the slurry in order to obtain good contact between the leach liquor, the nodule particles, and the synthesis gas 35, 37, 39 entering each of the leach tanks. The synthesis gas contains the reducing gas, carbon monoxide. In the leach tank the ground raw nodules are in intimate contact with an ammonium salt solution, preferably ammonium carbonate solution, at ambient temperature and pressure in the presence of carbon monoxide and cuprous ion. In the leaching tanks 25, 27, 29 the liquid-solid weight ratio is maintained preferably between about 20 to 40 or more.

The carbon monoxide is supplied by the synthesis gas. Preferably synthesis gas will be used containing a high proportion of carbon monoxide. A typical synthesis gas will contain between about 40 to about 60% carbon monoxide, between about 30% to about 45% hydrogen, between about 6 to about 12% water vapor, and a small quantity of nitrogen (1%). It is to be understood that a pure carbon monoxide gas could be used rather than a synthesis gas. However because of economic considerations synthesis gas is shown here. The only constituent of the synthesis gas that appears to enter into the reaction mechanism is the carbon monoxide.

It has been found that approximately half or more of the manganese dioxide reduction to manganous oxide occurs in the first leach stage or tank 25 with a concomitant selective leaching of the copper, nickel, cobalt and molybdenum from the nodule ore therein. Additional reduction of manganese dioxide to manganous oxide occurs in the second leach tank 27 and approaches total reduction in the last leach tank 29.

The nodule slurry in the leach tanks 25, 27, 29 may contain, for example, from about 2 to about 6% solids with about 5% solids being preferred. This corresponds to a liquid-solid weight ratio of from about 33 to about 17. The leach tanks are designed such that in each tank intimate mixing is occurring between the synthesis gas, nodules and the leach liquor. Overflow products 41, 43 from each tank are fed to the next succeeding tank. OFF-gas 47, 49, 51 are collected and disposed of from the leach tanks. The off-gas consists primarily of hydrogen with some unreacted carbon monoxide and ammonia.

From the last leach tank 29 the liquor-nodule slurry 45 is fed to one or more clarifiers represented as clarifier 53. From the clarifier 53 a nodule slurry 55, a containing from about 40 to about 50% solids, is fed to a series of wash thickeners 57, 59, 61. The clear overflow 65 from the clarifier is cooled by appropriate heat exchanger 63. A portion of the cooled, clear overflow is fed as reduction liquor recycle 11 to the previously mentioned tank 7. The remaining portion of the cool, clear overflow is fed back to the first leach tank 25 as the leach liquor 67 where it is combined with the undersize nodule slurry 19 from the cyclone 15. The aforementioned high solids content slurry 55 from the clarifier 53 is washed is a series of washing thickeners 57, 59, 61. The washing is accomplished with an aqueous solution containing ammonia and ammonium carbonate to produce a pregnant liquor. From about 3 to 8 washing thickener units may be employed. Wash liquor 69 is fed countercurrently to the high solid slurries in the washing process. The wash liquor removes the metal values from the solids producing a pregnant liquor 71, containing substantially all the copper, nickel and significant quantities of cobalt and molybdenum as leached from the nodules. The pregnant liquor 71 is obtained in a counter-current fashion from the first washing thickener unit 57. A portion of this pregnant liquor is recycled as the wash liquor recycle 9 into the aforementioned mixing tank 7 for slurrying with the nodules arriving at the mixing tank 7 from the cage mill 3. The thoroughly washed nodule tailings are further treated to recovver the manganese, iron and ammonia therefrom or disposed of as desired. Thus, a continuous process for recovering desirable minerals of copper, nickel, cobalt and molybdenum from wet, raw nodules has been described. The net pregnant liquor 73 is fed to the appropriate treating system for recovering copper, nickel, cobalt and molybdenum from the pregnant liquor.

REDUCTION-LEACH VARIATIONS

Of course, there are several variations pertaining to the manner in which the nodules, reducing gas and cuprous ions make contact.

Figure 2:
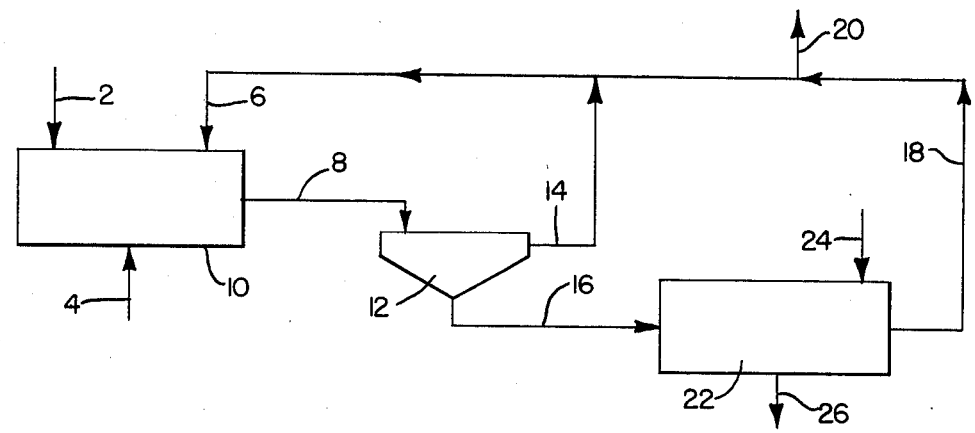
FIG. 2 is a flow sheet of an embodiment of the process of the present invention in which carbon monoxide absorption, cupric ion reduction to cuprous ion and the nodule reduction, all take place in a single vessel.

Referring specifically to FIG. 2 a process is shown where ground manganese nodules 2, a reducing gas 4, such as carbon monoxide, and an ammoniacal leach solution 6 containing a source of cuprous ions are intimately mixed in vessel 10. The nodules 2, reducing gas 4 and leach solution 6 are fed into the vessel 10 in a continuous manner such that the liquid-solid weight ratio is at least 20 or greater. A nodule leach liquor slurry stream 8 is withdrawn as overflow from vessel 10 and fed to clarifier 12 where leach liquor 14 is separated from the solids 16. The solids 16 containing entrained pregnant leach solution are fed to a washing system 22 where the solids are washed with an aqueous solution containing ammonia and ammonium carbonate 24 adjusted to the pH value of the process. A portion of the wash effluent 18 is withdrawn as pregnant solution 20 and fed to a metal recovery system (not shown). The remaining portion of the wash effluent 18 from the washing system is combined with the liquor 14 leaving the clarifier 12 and recycled as leach solution to vessel 10. The nodule residue 26 may be discarded or further processed to recover other values therefrom.

Figure 3:
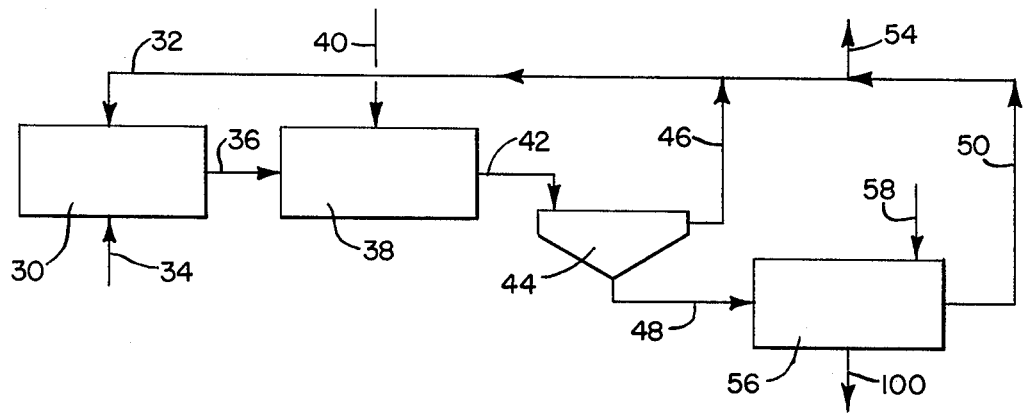
FIG. 3 is a flow sheet of an embodiment of the process of the present invention in which carbon monoxide absorption and cupric ion reduction to cuprous ion takes place in a first vessel and the nodule reduction takes place in a second vessel.

An alternate embodiment to the foregoing process is seen in FIG. 3. In a first vessel 30 an ammoniacal leach solution recycle 32 containing cupric ions is contacted with a reducing gas 34 such as carbon monoxide. The cupric ion present in the leach solution 32 are reduced to cuprous ions by the reducing gas 34 absorbed in the leach solution. The ammoniacal leach solution 36, containing the cuprous ions is fed to a second vessel 38 where ground nodules 40 and the ammoniacal cuprous ion leach solution 36 are intimately contacted on a continuous basis. The liquid-solid weight ratio in the vessel 38 should be maintained at least at 20 and preferably up to about 40 or higher. A slurry 42 of reduced nodules and leach liquor are fed to a clarifier 44. In the clarifier 44 the leach solution 46 is separated from the residue 48 containing entrained pregnant leach solution. The nodule residue 48 containing the entrained pregnant leach solution is fed to a wash station 56. The residue containing entrained pregnant leach solution is washed with an aqueous solution containing ammonia and ammonium carbonate 58 to produce a wash effluent 50. A first portion of wash effluent stream 50 is withdrawn as pregnant solution 54 and sent to a metal recovery system (not shown) for recovering the copper, nickel, cobalt and molybdenum. The leach solution 46 from the clarifier 44 is mixed with a second portion of the wash effluent 50 from the washing of the nodule residue and recycled as leach solution 32. The nodule residue 100 from the wash station 56 may be further treated to recover other values therefrom or discarded.

Figure 4:
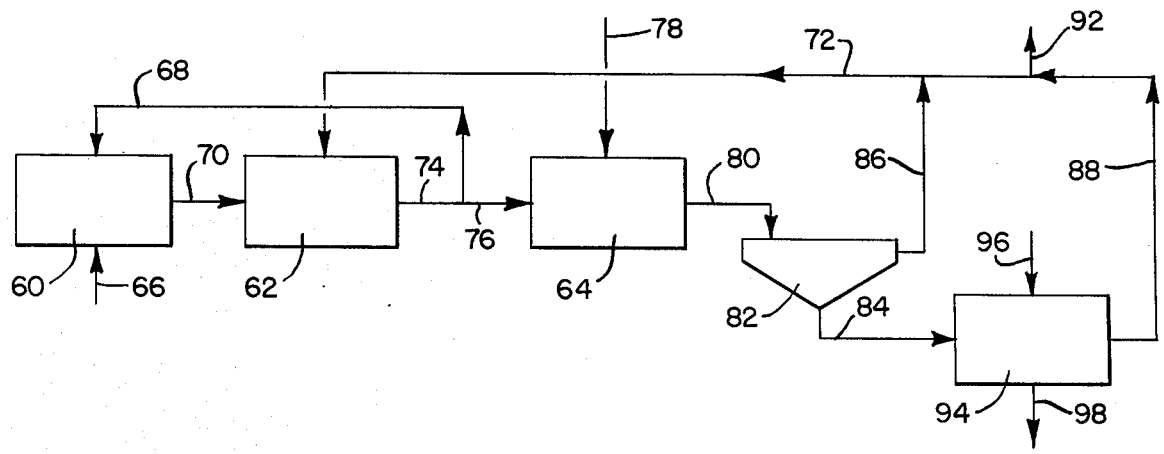
FIG. 4 is a flow diagram of yet another embodiment of the present invention in which the carbon monoxide absorption takes place in a first vessel, the cupric ion reduction to cuprous ion takes place in a second vessel, and the nodule reduction takes place in a third vessel; and, FIG. 5 is a flow sheet illustrating a pilot plant for processing manganese nodules in accordance with the present invention.

Yet a third embodiment of this process is shown in FIG. 4. This alternate process requires three vessels 60, 62 and 64. In the first vessel 60, a reducing gas 66 is contacted with a leach solution 68. The leach solution 68 absorbs the reducing gas 66 and is transferred by way of stream 70 to second vessel 62 where the leach solution, containing absorbed reducing gas, contacts a cupric ion recycle solution 72 and the cupric ions in the solution 72 are reduced to cuprous ions. The leach solution containing cuprous ion leaves the second vessel 62 as stream 74. A first portion of the process stream 74 is returned as the leach solution 68 containing cuprous ions to vessel 60 for absorption of the reducing gas 66. A second portion 76 of process stream 74 is fed to the third vessel 64 where it is contacted with ground manganese nodules 78. The liquid-solid weight ratio in the third vessel should be maintained at about 20 and preferably at about 40 or higher. In the third vessel 64 the ground manganese nodules 78 are reduced thus selectively leaching copper, nickel, cobalt and molybdenum from the nodules. The process stream 80 from third vessel 64 containing the nodule residue and the pregnant leach solution is fed to a clarifier 82. The nodule residue 84 containing entrained pregnant leach solution is fed to a wash station 94. The residue containing entrained pregnant leach solution is washed with an aqueous solution containing ammonia and ammonium carbonate 96 to produce a wash effluent 88. A first portion 92 of the wash effluent stream 88 is fed to a metal recovery system (not shown) for extraction of copper, nickel, cobalt and molybdenum from the wash effluent. The leach liquor 86 from clarifier 82 is mixed with a second portion of wash effluent 88 from the wash station 94 and recycled as stream 72. The nodule residue 98 from the wash station may be further treated to recover other values therefrom or discarded.

PILOT PLANT

Figure 5:
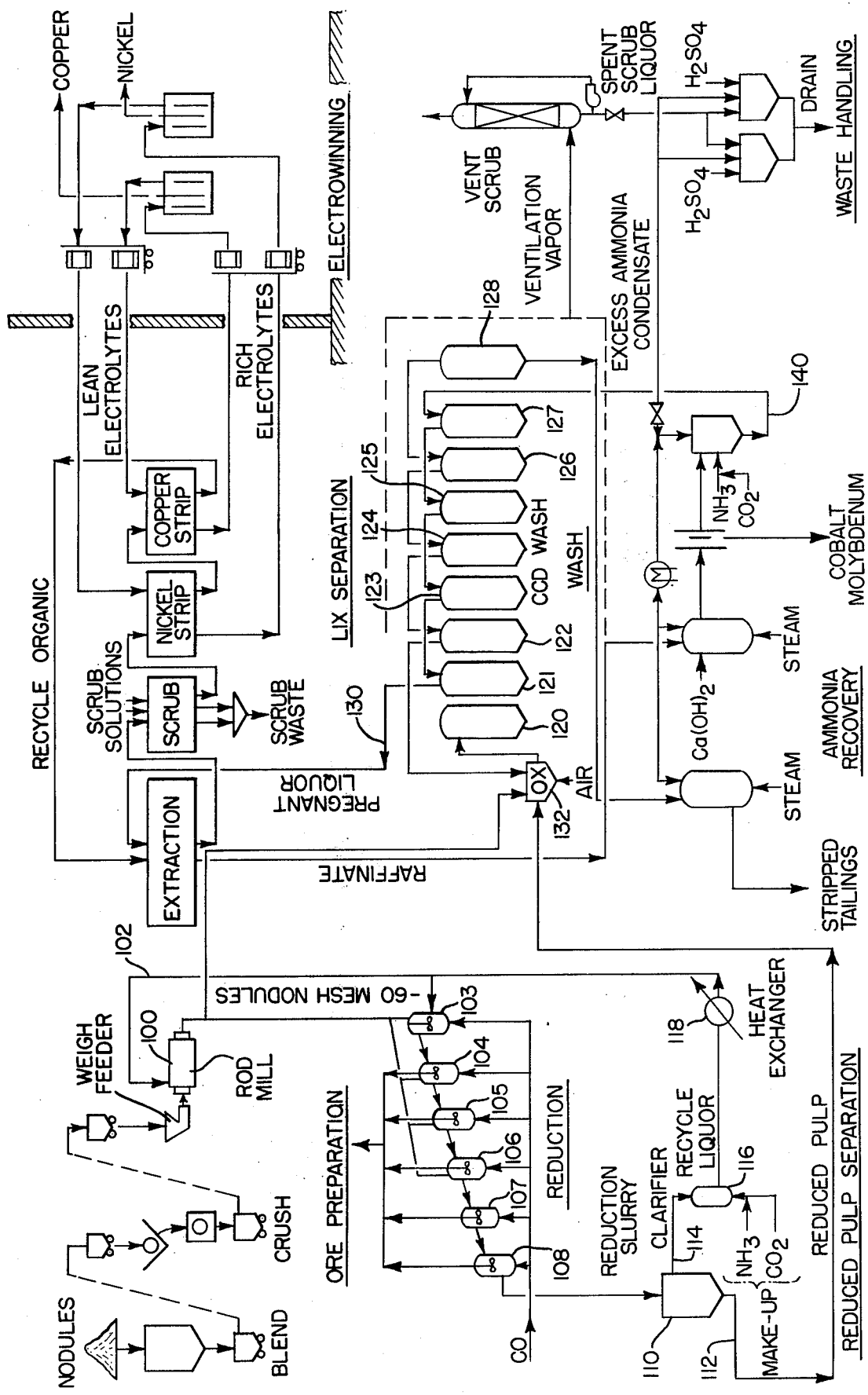

The process of the present invention is further illustrated by the following example in conjunction with FIG. 5 of the drawing. At the outset, however, it is emphasized that the following description relates to a procedure that has been performed in a pilot plant. By extrapolating the results obtained from the pilot plant, however, one skilled in this art can design a commercial plant for processing large quantities of nodules in accordance with the present invention.

The pilot plant was designed for one half ton per day nodule throughput, based on a 3½ percent solid slurry and with up to a two hour hold-up in the reduction section.

The process performed in the pilot plant can be broken down in the following sections:
1. Ore Preparation
2. Reduction-Leach
3. Oxidation and Wash-Leach
4. LIX Separation of the Metals
5. Electrowinning

ORE PREPARATION

The nodules utilized in the pilot plant process are received in 55 gallon drums in the condition that they are in after being mined from the deep sea ocean bottom. To facilitate processing in the pilot plant, the nodules are air dried. After they are dried, they are then blended, using the "cone and quarter" technique before going into the primary crushing circuit. The primary crushing circuit consists of a Jacobsen "Full Nelson" crusher to reduce the raw nodules to minus one inch. Thereafter, the nodules are passed through a Stedman double row cage mill to reduce the ore further to minus 6 mesh. The nodules are then conveyed away on a belt feeder to drums for storage or further processing.

The second grinding circuit is the final stage of ore preparation before the nodules enter the reduction stage. This circuit consists of a hopper, filled from the drums of cage milled ore, located on top of a hydraulic weigh feeder. The weigh feeder is used to meter nodules at a given rate into an open circuit rod mill 100 for final grinding. The rod mill reduces the nodules from a particle size of minus six mesh to a particle size of approximately minus sixty mesh. As the nodules enter the rod mill, they are wetted with a synthetic sea water which brings the nodules up to approximately 40% moisture. This moisture content corresponds to the moisture which would be present in nodules as they are brought up from the sea bottom or reclaimed from wet storage. At this point, it should be noted that in a commercial operation, the nodules would be processed directly after being mined from the ocean bottom; thus, the foregoing steps of drying and wetting the nodules would be unnecessary. However, for purposes of a pilot plant operation it was found convenient to air dry the nodules and later wet the nodules so that they had a moisture content equivalent to that of freshly mined nodules.

It has been found advantageous to add recycle reduction liquor 102 to the rod mill. In a commercial process recycle liquor can be added to the grinding mill in order to provide a liquor to facilitate grinding and reduce the dust problem without introducing more water into the circuit which would cause undesirable dilution. Of course, the recycle reduction liquor is advantageous in maintaining the proper copper concentration in the reduction circuit as well as to provide liquor which is useful in the grinding process itself. Details of the recycle liquor circuit are amplified below.

REDUCTION-LEACH

The reduction-leach portion of the pilot plant is the location where the nodules are chemically reacted to make the metals of interest soluble in an ammoniacal ammonium carbonate solution. This is accomplished by reducing and converting the $MnO_2$ in the nodules to $MnCO_3$.

After leaving the rod mill, the nodules are passed through a conduit into a vibrating screen (not shown). The purpose of the screen is to remove any tramp material. The screen utilized is a Sweco vibrating screen. The material that enters and leaves the screen is actually a liquid slurry. Connected to the screen is a surge tank (not shown). The purpose of the surge tank is to serve as a storage unit so that the process plant will not have to be shut down in the event that there is a malfunction in some piece of ore preparation machinery. After leaving the surge tank, a feed pump pumps the slurry to the reduction circuit.

The reduction circuit includes six reactors 103, 104, 105, 106, 107 and 108 connected in series. These reactors are sixty gallon capacity reactors which are used to a 42 gallon capacity in the actual processing. Each reactor is formed of 316 stainless steel and is outfitted with an agitator, pressure gage, level alarms, and gas sparging equipment. In accordance with the present invention, it is advantageous to provide reactors which can withstand pressures at least up to 100 lb/sq in.

Gas sparging is directed underneath the agitator from the bottom of the reactor where a reduction gas containing 95 percent carbon monoxide and 5 percent hydrogen is introduced. This mixture is used because it is similar to a reduction gas mixture that is available in commercial quantities. Of course, hydrogen is unnecessary in the process. Indeed, the only gas necessary for the process is carbon monoxide. The off gas coming out of the reactors first goes through condensers (not shown) which remove some of the water in the gases before going to off gas rotameters (not shown) which give an indication of the amount of gases coming out of a reactor. The off gases go through an ammonia scrubber (not shown) and are exited to the atmosphere.

The reactors themselves are outfitted with gravity overflows so that there is a cascading system from the first (103) through the sixth reactor (108).

In one important embodiment of the invention, each of the first four reactors 103–106 is fed an equal or variable amount of feed stock. That is, 25 percent or combinations equalling 100% of the slurry being pumped from the ore preparation circuit will go into each of the first four reactors. It should be noted, however, that there are a large number of possible ways of accomplishing multipoint injection. That is, the nodule slurry can be injected into two, three, five or more reactors and the amount of slurry going into any given reactor need not be equal to the amount going into the others. It has been found advantageous, however, that there be no nodule injection into at least the last reactor. That is, each portion of nodules should pass through two reactors in progression before leaving the reduction system; therefore, there should be no nodule injection in the last reactor. It should be noted that in the pilot plant process there is no nodule injection in the last two reduction reactors (107 and 108). Each reactor contains a mechanical impeller to achieve mechanical agitation which disperses the gas and suspends the solids. It has been established that the reaction rate of cuprous ion regeneration is influenced by gas-liquid mass transfer rate of carbon monoxide. The rate is affected primarily by the extent of gas-liquid interfacial area, which is in turn affected by the method used to disperse the gas.

While the nodules are fed to the first four reactors, carbon monoxide is sparged into the bottom of each reactor as required. Preferably the carbon monoxide is sparged into each reactor under pressure so that the pressure in each reactor is between the range of 50–100 lbs/sq in. The slurry in the fifth and sixth reactors is approximately 3.5 percent solids and the average residence time in the system is 20 minutes per reactor. The slurry overflowing the last reactor is flocculated to enhance settling before entering a clarifier. The clarifier is used to separate the liquid from the solids.

START-UP

The process of the present invention is directed toward a continuous process in which nodules are continuously processed to produce various desirable metals. In order to reach a continuous steady state, the reactor vessels must be loaded with start-up materials. Thus, each of the six reactors are filled with an ammonia-ammonium carbonate solution containing approximately 100 grams per liter total ammonia and between about 15 and 20 grams per liter total carbon dioxide. After the reactors are filled with the ammonia-ammonium carbonate solution, copper metal is added and is partially oxidized. The metal is added as a copper powder and is oxidized to convert some of the copper to cuprous ions. Hydroxyl ions are also produced with the cuprous ions. Enough copper metal is added so that 10 grams per liter copper in solution results. The next step in the start-up procedure is to check the cuprous ion concentration. Thus, the mixture in each reactor is analyzed to make sure that the cuprous ion concentration is at an acceptable level of about 7 grams per liter. If more cuprous ions are needed, this can be accomplished by passing the reducing gas through the bottom of the reactor. The first three reactors have pH loops which consist of a finger pump which pumps the solution to a housing which contains a pH electrode. The pH is then measured in a readout on a control panel. The pH is a valuable control device and can be used to indicate whether or not the carbon dioxide, ammonia or cuprous ions have gone off the specified limits.

After the reactor vessels have been loaded for startup as set forth above, the manganese nodules are added to the first four reactors. The total rate of feed to the four reactors is about 30 pounds per hour of nodules. As the nodules are being fed into the reactors, carbon monoxide is sparged through the bottom of the reactors under a pressure of about 1–2 psi in at a total rate of about 70 standard cubic foot per hour. At this point is should be noted that the amount of carbon monoxide that is fed into each reactor is controlled by the cuprous ion concentration of the contents of any given reactor. This is determined by analyzing the contents of the reactor periodically. During start-up, this is done every half hour and is continued once an hour while the process is in the steady state.

Approximately 120 gallons per hour of reduction slurry enters the clarifier 110. The solids 112 leave the bottom of the clarifier in the form of a slurry with approximately a 40 percent solids content. The overflow 114 from the clarifier is clear liquid which constitutes the recycle reduction liquor 102. However, after leaving the clarifier, the recycle reduction liquor enters a surge tank (not shown) whereupon it is passed into an ammonia makeup unit 116. Gaseous ammonia and carbon dioxide are sparged into the ammonia makeup unit in order to keep the ammonia and carbon dioxide content of the liquid at a prescribed level. At steady state, that level is approximately 100 grams per liter ammonia and the $CO_2$ content about approximately 25 grams per liter. After leaving the makeup unit, the liquid is pumped by a metering pump through a heat exchanger 118 into the first reactor 103 and the rod mill 100. The heat exchanger removes heat that was generated in process and lowers the temperature of the liquid from about 55° to about 40°C.

OXIDATION AND WASH-LEACH

In the oxidation and wash-leach circuit, the clarifier underflow is combined with second stage wash liquor and the resulting slurry is oxidized with air to convert the cuprous ion in the clarifier underflow to cupric ion to facilitate future processing. The oxidized slurry is then pumped to a counter-current decantation system (CCD) consisting of seven stages of countercurrent washing units. In the pilot plant, the wash-leach steps are carried out on a batch basis in nine tanks (120 to 128) which are used to simulate a countercurrent wash system. It has been found that a seven reactor countercurrent system is advantageous. However, to simulate a seven reactor system, two extra reactors are necessary because one unit is either being filled or is being emptied. In the wash-leach system, the metal solubilization is completed as the displacement wash process is carried out. Fresh wash liquor 140 is added to the seventh stage of the system as a solution containing 100 grams per liter ammonia and 100 grams per liter carbon dioxide. Liquor is transferred from one tank of the settled slurry every 12 hours to another appropriate tank in the system to affect the counter current washing. The carbon dioxide concentration varies throughout the washing system and exits in the pregnant liquor which contains approximately 65 grams per liter $CO_2$. This decrease in $CO_2$ concentration is due to the fact that the slurry entering the oxidation and wash-leach circuit has a liquor phase which contains only 25 grams per liter $CO_2$. Pregnant liquor 130 containing the metal to be recovered, is decanted from the first wash stage and pumped to a surge tank (not shown). Fresh ammonia solution without metals is added (not shown) to the last solids wash stage 121. The metal values in solution range from approximately 0 in the fresh wash liquor to between 4–8 grams per liter copper and 5–10 grams per liter nickel in the pregnant liquor. Of course, other metal values are also present in the pregnant liquor but nickel and copper are the major metal values of interest.

After the wash-leach step, the pregnant metal bearing liquor is piped off for further processing as is explained below. The second stage wash is recycled back to the oxidation reaction 132. The tailings, which are nothing more than reduced nodules washed of most of their non-ferrous metal values and with the manganese converted to manganese carbonate, are sent to a surge tank (not shown). From the surge tank, they are then pumped to a steam stripping operation where the ammonia and $CO_2$ are driven off. The tailings are then drummed. The ammonia and $CO_2$ obtained in the steam stripper may be recycled.

LIQUID ION EXCHANGE SEPARATION

The pregnant liquor contains various metal values including copper, nickel, cobalt and molybdenum. In the liquid ion exchange separation circuit, the object is to separate the copper, nickel, cobalt and molybdenum from each other and from the pregnant liquor. Initially, the copper and nickel are coextracted by an organic extractant in a series of mixer/settler units. The organic extractant is LIX-64N in a kerosene base. LIX-64N is an extractant sold by General Mills Chemicals, Inc.

The copper and nickel free liquor (raffinate) is sent to a storage tank before it is steam stripped.

The organic extractant which contains copper and nickel values is washed with an $NH_4 HCO_3$ solution followed by an ammonium sulfate solution to remove ammonia picked up during extraction. This scrubbing operation is carried out in another series of mixer settlers. The organic extractant is then stripped with a weak $H_2SO_4$ solution (pH about 3) to preferentially remove nickel. Thereafter, the copper is stripped, which is accomplished by using a stronger (160 g/l) $H_2SO_4$ solution. The copper and nickel free organic extractant is recycled to the metal extraction circuit of the LIX process.

The raffinate which contains cobalt, molybdenum and some trace impurities that were not extracted into the organic phase is sent into a surge tank for future processing to recover cobalt and molybdenum. In the cobalt and molybdenum recovery circuit, the ammonia and $CO_2$ are stripped from the raffinate thereby precipitating cobalt. The ammonia and $CO_2$ are condensed and sent back to the process for recycling. The cobalt precipitate is separated from the liquor and the liquor is subsequently treated with hydrated lime to precipitate the molybdenum. The resulting slurry is agitated and then allowed to settle. The solution which no longer contains cobalt and molybdenum is recycled back to the process as fresh wash liquor. Ammonia and $CO_2$ are added to the solution to bring it up to the prescribed concentration. For further details of a liquid ion exchange procedure which can be employed, see U.S. Pat. No. 3,853,275 entitled Selective Stripping Process by Roald R. Skarbo, filed June 28, 1972, the teaching of which are incorporated herein by reference.

ELECTROWINNING

Metal recovery is accomplished by electrowinning copper and nickel from the solution prepared in the LIX plant as described above. This process is performed on a batch continuous basis for the copper recovery and on a continuous basis for the nickel recovery in a separate plant. The metal containing solutions are transferred once a day.

CONCLUSION

From the foregoing, it should be apparent that the broad concept of the present invention is to utilize cuprous ions to reduce the manganese nodules to enable the metal values contained therein to be leached. One advantage of using cuprous ions is that they can be regenerated by reducing cupric ions with carbon monoxide which is a relatively inexpensive reducing gas. Thus, the actual consumable reducing agent in the present invention is carbon monoxide. There are many process parameters disclosed in the foregoing specification. These parameters, however, have been disclosed merely to provide an illustration of the broad concept of the invention which, as stated above is the use of cuprous ions to reduce manganese nodules. Process parameters include such items as the concentration of cuprous ions utilized to reduce the nodules in the leach solution; the amount of ammonia and carbon dioxide in the ammoniacal leach solution, the temperature during leaching, the pressure during leaching, and the pH of the system during leaching and during cuprous ion regeneration. Other parameters include the concentration of the solids in the system, the rate of addition of reducible ore solids, the rate of agitation, and the concentration or purity of the reducing agent.

With regard to the amount of cuprous ions used during nodule reduction the reaction between the cuprous ions and the manganese oxide in the nodules is a stoichiometric reaction; and it has been found that the process is operable with a leach liquor containing as little as 2.2 g/l cuprous ions. Of course, there is really no upper limit to the cuprous ion content of the leach liquor other than that dictated by the ability of the leach liquor to hold the cuprous ions and other metals that may also be leached in solution. A reasonable upper limit for the cuprous ions concentration of the leach liquor is 20 g/l cuprous ions.

In accordance with the present invention, actual runs have been performed in the pilot plant with a leach liquor containing 2.8 – 4.6 g/l of cuprous ions. The leach liquors containing cuprous ions within the foregoing range resulted in manganese dioxide reduction efficiencies of about 98 percent.

In accordance with the present invention, actual runs have been performed in the pilot plant with a leach liquor containing 2.8 to 4.6 g/l of cuprous ions. The major operating parameters are specified in Table III. These conditions resulted in manganese dioxide reduction efficiencies of approximately 98 percent in the sixth reactor stage, as shown in Table IV.

TABLE III

Operating Parameters and Results for
Pilot Plant Reduction Run 7 (August 1974)

| | |
|---|---|
| Total copper concentration | 4.8 g/l |
| Cuprous concentration | 2.8 to 4.6 g/l |
| Nickel concentration | 6.9 g/l |
| pH (measured at 50°C) | 10.6 |
| Temperature | 46 to 50°C |
| Carbon monoxide purity | 93 volume percent |
| Nodule retention time/stage | 20 minutes |
| Ammonia concentration | 115 g/l |
| Carbon dioxide concentration | 20 g/l |

TABLE IV

Extent of Reduction

| Stage | Time, hour | % Mn Reduced |
|---|---|---|
| 1 | 23 | 89.2 |
| 1 | 25 | 91.5 |
| 1 | 47 | 73.4 |
| 1 | 73 | 88.2 |
| 1 | 73 | 91.7 |
| 2 | 73 | 94.0 |
| 3 | 73 | 96.9 |
| 5 | 73 | 97.8 |
| 6 | 4 | 97.2 |

TABLE IV-continued

Extent of Reduction

| Stage | Time, hour | % Mn Reduced |
|---|---|---|
| 6 | 10 | 96.4 |
| 6 | 24 | 98.2 |
| 6 | 25 | 98.3 |
| 6 | 36 | 96.0 |
| 6 | 48 | 98.3 |
| 6 | 60 | 97.4 |
| 6 | 73 | 97.9 |
| Clarifier | 25 | 99.7 |
| " | 36 | 98.4 |
| " | 48 | 99.0 |
| " | 60 | 98.8 |
| " | 73 | 99.4 |

It should be apparent that the foregoing parameters are merely details which are well within the skill of those in this art, once one skilled in this art is taught to reduce the manganese nodules with cuprous ions. Thus, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A process for treating manganese nodules to enable at least one metal values selected from the group consisting of copper, nickel, cobalt and molybdenum to be recovered therefrom comprising the steps of:
   a. grinding the nodules;
   b. contacting the ground nodules with an ammoniacal solution containing cuprous ions to reduce the manganese oxides in the nodules and enable the metal values to be recovered to be leached from the nodules into the leach solution; and
   c. separating the leach solution containing the metal values to be recovered from the reduced nodules.

2. The process as set forth in claim 1 wherein copper values are recovered from the leach solution.

3. The process as set forth in claim 1 wherein nickel values are recovered from the leach solution.

4. The process as set forth in claim 1 wherein copper and nickel values are recovered from the leach solution.

5. The process as set forth in claim 1 including the step of washing the reduced nodules with a wash leach solution after the separation which takes place in step (c) to remove entrained metal values from the reduced nodules and recovering the metal values to be recovered from the wash leach solution.

6. The process as set forth in claim 1 wherein step (b) the ground nodules are contacted with cuprous ions in an ammoniacal solution containing from about 60 to 140 grams per liter ammonia.

7. The process as set forth in claim 6 wherein cuprous ions are formed in the ammoniacal solution by reducing cupric copper to cuprous copper.

8. The process as set forth in claim 7 wherein cupric copper is reduced to cuprous copper by bubbling a reducing gas through the ammoniacal solution.

9. The process as set forth in claim 8 wherein the cupric copper is reduced to cuprous copper by bubbling a reducing gas containing carbon monoxide through the ammoniacal solution.

10. The process as set forth in claim 9 wherein the nodules reduced in step (b) are washed with an ammoniacal washleach solution to remove entrained metal values from the nodules and in step (c) the wash-leach solution is separated from the washed nodule residue and the metal values are recovered from the wash-leach solution.

11. The process as set forth in claim 10 wherein the ammoniacal solution used to reduce the nodules in step (b) is separated from the reduced nodules and is recycled to contact ground nodules.

12. The process as set forth in claim 6 wherein in step (b) the nodules are contacted with the ammoniacal solution to produce a slurry containing from about 2 to about 20% by weight solids.

13. The process as set forth in claim 12 wherein cuprous copper is regenerated in the leach solution by reducing cupric copper to cuprous copper by bubbling a reducing gas containing carbn monoxide through the slurry.

14. The process as set forth in claim 1 wherein in step (b) the temperature of the leached solution is between the range of 40° – 70°C.

15. The process as set forth in claim 14 wherein in step (b) the ground nodules are leached for a period of time between the range of 45 minutes to 2 hours.

16. A continuous process for treating manganese nodules to enable metal values selected from the group consisting of copper, nickel, cobalt and molybdenum to be recovered therefrom comprising the following steps:
 a. contacting and intimately mixing a cuprous ion containing ammoniacal solution with the manganese nodules to form a slurry, the contacting and mixing of the cuprous ions and nodules reducing the manganese in the nodules as the cuprous ions form cupric ions;
 b. contacting the slurry with a reducing gas to reduce cupric ions to cuprous ions and thereby maintain a continuous supply of cuprous ions;
 c. separating the reduced nodules from the ammoniacal solution;
 d. washing the reduced nodules obtained in step (c) with a wash solution to remove entrained metal values therefrom the yield a wash effluent containing the metal values to be recovered; and,
 e. recovering metal values from the wash effluent.

17. The process as set forth in claim 16 wherein the manganese nodules are ground prior to being mixed with the ammoniacal solution.

18. The process as set forth in claim 17 wherein the ammoniacal solution separated from the reduced nodules in step (c) is recycled back to the slurry formed in step (a).

19. The process as set forth in claim 17 wherein in step (a) the manganese nodules are contacted with a cuprous ion containing ammoniacal solution containing from about 60 to about 140 grams per liter ammonia.

20. The process as set forth in claim 19 wherein in step (a) the nodules are mixed with the ammoniacal solution to produce a slurry containing from about 2 to about 20 weight percent nodule solids.

21. The process as set forth in claim 20 wherein in step (b) the slurry is contacted with a reducing gas containing carbon monoxide.

22. A continuous process for treating manganese nodules to enable copper, nickel, cobalt and molybdenum values contained therein to be recovered therefrom comprising the steps of:
 a. contacting a copper containing ammoniacal leach solution with a reducing gas in a vessel to reduce the copper and produce an ammoniacal leach solution containing cuprous ions;
 b. contacting the ammoniacal leach solution containing cuprous ions prepared in step (a) with ground manganese nodules to form a slurry and reduce the manganese oxides in the nodules;
 c. separating the reduced nodules in the slurry from the leach solution to leave a pregnant leach solution containing copper, nickel, cobalt and molybdenum metal values;
 d. washing the nodule residue with an ammoniacal-ammonium carbonate wash solution to remove entrained metal values from the nodule residue and yield a wash effluent containing copper, nickel, cobalt and molybdenum values; and
 e. recovering metal values from the wash effluent.

23. The process as set forth in claim 22 wherein the pregnant leach solution separated from the reduced nodules in step (c) is recycled back to the vessel.

24. The process as set forth in claim 23 wherein in step (b) the ground nodules are contacted with an ammoniacal leach solution containing from about 60 to about 140 grams per liter ammonia and copper as cuprous ion.

25. The process as set forth in claim 24 wherein in step (b) the ground nodules are contacted with the leach solution to produce a slurry containing from about 2 to about 20 weight percent nodule solids.

26. A process for treating manganese deep sea nodules to enable metal values selected from the group consisting of copper, nickel, cobalt and molybdenum contained therein to be recovered comprising the following steps:
 a. loading a plurality of vessels connected in series with an ammoniacal leach solution containing cuprous ions;
 b. grinding manganese nodules;
 c. introducing the ground nodules into a vessel loaded in step (a) to form a slurry in which the manganese in the nodules is reduced by the cuprous ions to enable metal values in the nodules to be solubilized in the ammoniacal leach solution while the cuprous ions form cupric ions;
 d. contacting the slurry in the series of vessels with carbon monoxide to convert cupric ions to cuprous ions;
 e. cascading the slurry in one vessel to the next vessel in the series of vessels;
 f. withdrawing the slurry from a last vessel in the series of vessels;
 g. separating a pregnant leach solution from the nodule residue;
 h. recycling the pregnant leach solution to a vessel as pregnant leach solution recycle;
 i. washing the nodule residue with wash liquor to remove entrained pregnant leach liquor from the nodule residue and to produce a pregnant wash liquor, and
 j. recovering metal values from the pregnant wash liquor.

27. The process as set forth in claim 26 wherein in step (b) the nodules are ground to yield particles with a size in the range of between minus 60 mesh to about minus 120 mesh.

28. The process as set forth in claim 27 wherein in step (i) the nodule residue is washed with an ammonia-ammonium carbonate wash liquid having an ammonia concentration of about 60 to 140 grams per liter.

29. In a process for recovering metal values from a complex manganese ore in which the metal values to be recovered are bound within the ore by manganese oxides, the process being of the type in which the manganese ore is reduced to enable the metal values contained therein to be solubilized in a leach solution wherein the improvement comprises contacting the manganese ore with an aqueous solution containing cuprous ions to reduce the manganese oxides in the ore and enable the metal values to be leached therefrom.

30. The process as set forth in claim 29 wherein the manganese oxides are reduced with an ammoniacal aqueous solution containng cuprous ions.

31. The process as set forth in claim 30 wherein the cuprous ions form cupric ions after reducing the ore and in which cuprous ions are regenerated by reacting cupric ions with a reducing gas to convert the cupric ions back to cuprous ions.

32. The process as set forth in claim 31 wherein the cupric ions are reduced with a reducing gas containing carbon monoxide.

33. The process as set forth in claim 32 wherein the ore is reduced with an aqueous solution of cuprous ions containing 60 to 140 grams per liter ammonia.

34. The process as set forth in claim 33 wherein the ore is ground prior to being reduced to result in particles with a size within the range of minus 60 to about minus 120 mesh.

35. The process as set forth in claim 32 wherein the manganese ore is reduced by cuprous ions in a vessel and cuprous ions are regenerated in the same vessel by bubbling carbon monoxide into that vessel.

36. The process as set forth in claim 32 wherein cupric ions are reduced to cuprous ions in a first vessel by bubbling carbon monoxide into the first vessel and wherein the cuprous ions formed in the first vessel are passed into a second vessel to reduce the manganese oxides in the ore.

37. The process as set forth in claim 32 wherein carbon monoxide is introduced into an ammoniacal liquor in a first vessel, with the ammoniacal liquor absorbing the carbon monoxide, the ammoniacal leach solution containing the absorbed carbon monoxide being passed into a second vessel containing cupric ions to reduce the cupric ions to cuprous ions and the ammoniacal solution containing the cuprous ions being passed into a third vessel into which manganese ores are introduced to reduce the manganese oxide in the ores.

38. The process as set forth in claim 28 wherein the ore is leached with an ammoniacal leach solution after the manganese oxides in the ore have been reduced and wherein the copper and nickel values are extracted from the leach solution by a liquid ion exchange extractant capable of extracting copper and nickel values from ammoniacal leach solutions.

39. The process as set forth in claim 38 wherein the copper and nickel values are stripped from the ion extractant and are recovered by electrowinning.

40. The process as set forth in claim 39 wherein the temperature during the reduction of the manganese oxide in the ore is between the range of 40° – 70°C.

* * * * *